Patented June 9, 1942

2,286,169

UNITED STATES PATENT OFFICE 2,286,169

AROMATIC SUBSTITUTED METHYL ESTERS OF HYDRAZOIC ACID AS INSECTICIDES

Ingenuin Hechenbleikner, Stamford, Conn., assignor to American Cyanamid Company, New York, N. Y., a corporation of Maine No Drawing. Application May 31, 1940, Serial No. 338,046

4 Claims. (Cl. 167—30)

The present invention relates to insecticides and more particularly to a class of compounds which are especially effective as contact poisons for the control of insect pests.

The invention is based upon the discovery that aromatic substituted methyl esters of hydrazoic acid of the general formula:

in which R is an aryl radical, and R' and R" represent hydrogen or an aryl radical, possess high insecticidal activity against insets which are particularly difficult to exterminate, for example, the red spider, and that such activity is attained without any substantial harmful or detrimental action on the vegetation infested with the insect.

The following examples illustrate in detail the preparation of representative compounds of the invention. Materials employed are in parts by weight.

Example 1

| | Parts |
|---|---|
| Triphenylmethyl chloride | 5 |
| Sodium azide | 1.2 |
| Acetone | 40 | were mixed together in a vessel and heated upon a steam bath under reflux for 1 hour. The solution was poured into water, extracted with ether and dried over sodium sulfate. The ether was evaporated upon a steam bath leaving triphenyl azido methane as a colorless crystalline residue. After recrystallization from petroleum ether the product had a melting point of 64° C.

Example 2

A mixture of 10 parts of 1-naphthylmethyl chloride, 5 parts of sodium azide, and 40 parts of absolute alcohol was heated in a vessel under reflux upon a steam bath for 3 hours. The reaction mixture was poured into water, extracted with ether and dried over sodium sulfate. After removal of the ether, the 1-naphthyl azido methane was recovered as a colorless odorless mobile liquid boiling at 123° C. at less than 1 mm. pressure.

Spray solutions were prepared by dissolving the above insecticidal compounds in a solvent medium consisting of 65% acetone and 35% water. The following table shows the kills obtained under comparable condition when the sprays were applied to the citrus red spider.

| Compound | Dilution | Percent kill |
|---|---|---|
| Triphenyl azido methane | *1–1000 | 100 |
| Do | 1–2000 | 100 |
| Do | 1–4000 | 87.5 |
| Do | 1–8000 | 69 |
| 1-naphthyl azido methane | 1–1000 | 100 |
| Do | 1–2000 | 87.3 |

*A 100% kill of the red spider eggs is obtained in conjunction with the 100% kill of the active forms.

It is believed that the 1-naphthyl azido methane is a new compound.

Similarly, other aromatic substituted methyl esters of hydrazoic acid, for example, phenyl azido methane, diphenyl azido methane, di-1-naphthyl azido methane, tri-1-naphthyl azido methane, 1-naphthyl phenyl azido methane, 1-naphthyl diphenyl azido methane, and di-1-naphthyl phenyl azido methane having insecticidal activity may be prepared as in the above examples.

These new insecticides may be applied in any of the conventional manners. Thus, for example, they may be incorporated in liquids for spraying purposes, or they may be effectively used in dusts with such inert solid diluents as wood flour, walnut shell, talc and the like.

While the invention has been described with particular reference to specific embodiments it is to be understood that it is not to be limited thereto but is to be construed broadly and restricted solely by the scope of the appended claims.

I claim:

1. An insecticidal composition including a toxic amount of a compound of the general formula:

in which R is an aryl radical and R' and R" are selected from the group consisting of hydrogen and an aryl radical.

2. An insecticidal composition including a toxic amount of diphenyl azido methane.

3. An insecticidal composition including a toxic amount of triphenyl azido methane.

4. An insecticidal composition including a toxic amount of 1-naphthyl azido methane.

INGENUIN HECHENBLEIKNER.